US007009932B2

(12) United States Patent
Matheus et al.

(10) Patent No.: US 7,009,932 B2
(45) Date of Patent: Mar. 7, 2006

(54) FREQUENCY TRACKING DEVICE FOR A RECEIVER OF A MULTI-CARRIER COMMUNICATION SYSTEM

(75) Inventors: Kirsten Matheus, Nürnberg (DE); Udo Wachsmann, Schwabach (DE); Uwe Dettmar, Bornheim (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 751 days.

(21) Appl. No.: 09/867,711

(22) Filed: May 31, 2001

(65) Prior Publication Data

US 2002/0021715 A1    Feb. 21, 2002

(30) Foreign Application Priority Data

Jun. 5, 2000 (EP) ................... 00111096

(51) Int. Cl.
*H04L 11/00* (2006.01)
(52) U.S. Cl. ............... 370/208; 370/203; 370/343; 375/260
(58) Field of Classification Search ............... 370/203, 370/204, 208, 343, 210
See application file for complete search history.

(56) References Cited

U.S. PATENT DOCUMENTS

| | | | |
|---|---|---|---|
| 4,604,583 A | | 8/1986 | Aoyagi et al. |
| 5,307,376 A | | 4/1994 | Castelain et al. |
| 5,914,933 A | * | 6/1999 | Cimini et al. ............... 370/208 |
| 6,028,900 A | | 2/2000 | Taura et al. |
| 6,035,003 A | * | 3/2000 | Park et al. ................... 375/326 |
| 6,359,926 B1 | * | 3/2002 | Isaksson et al. ............ 375/219 |

(Continued)

FOREIGN PATENT DOCUMENTS

DE    197 21 864 A1    11/1997

(Continued)

OTHER PUBLICATIONS

Optimum receiver design for OFDM-based broadband transmission .II. A case study Speth, M.; Fechtel, S.; Fock, G.; Meyr, H.; Communications, IEEE Transactions on, vol.: 49, Issue: 4, Apr. 2001 pp.: 571-578.*

(Continued)

*Primary Examiner*—Andrew C. Lee
(74) *Attorney, Agent, or Firm*—Nixon & Vanderhye, P.C.

(57) ABSTRACT

A frequency tracking device (FTD) in particular for use in a OFDM communication system comprises a selector (SEL) which selects on the basis of N channel coefficients ($C_{est}$) a number M of subcarriers corresponding to the M channel coefficients ($C_{est}$) having the largest absolute values. An evaluator (EVAL) of the frequency tracking device (FTD) determines a frequency deviation estimate ($f_{off,est}$) on the basis of the selected M subcarriers and the selected M channel coefficients. In addition to or instead of a feedback correction unit (CORR1) provided upstream of a multi-carrier filter bank (8; FFT), the frequency tracking device (FTD) can also comprise a feed forward correction unit (CORR2) provided downstream of the receiver multi-carrier filter bank (8). In this case the selector (SEL) and the feed forward correction unit (CORR2) operate on the same data symbols such that the correction unit (CORR2) corrects the same data symbols which are subject to the selection and evaluation process in the selector (SEL) and the evaluator (EVAL). Based on the selection and evaluation processes frequency deviations ($f_{off}$) which are introduced into multi-carrier symbols when being transmitted between a transmitter multi-carrier filter bank (4; IFFT) and a receiver multi-carrier filter bank (8; FFT) can be corrected more efficiently, e.g. with a reduced computational complexity.

27 Claims, 11 Drawing Sheets

3rd EMBODIMENT

U.S. PATENT DOCUMENTS

| | | | |
|---|---|---|---|
| 6,359,938 B1 * | 3/2002 | Keevill et al. | 375/316 |
| 6,452,987 B1 * | 9/2002 | Larsson et al. | 375/345 |
| 6,493,395 B1 * | 12/2002 | Isaksson et al. | 375/261 |
| 6,546,056 B1 * | 4/2003 | Rosenlof | 375/260 |
| 6,549,583 B1 * | 4/2003 | Crawford | 375/260 |
| 6,594,320 B1 * | 7/2003 | Sayeed | 375/281 |
| 6,618,352 B1 * | 9/2003 | Shirakata et al. | 370/203 |
| 6,628,606 B1 * | 9/2003 | Hong et al. | 370/208 |
| 6,628,738 B1 * | 9/2003 | Peeters et al. | 375/371 |
| 6,654,408 B1 * | 11/2003 | Kadous et al. | 375/148 |
| 6,658,063 B1 * | 12/2003 | Mizoguchi et al. | 375/260 |

FOREIGN PATENT DOCUMENTS

| | | |
|---|---|---|
| DE | 197 53 084 A1 | 6/1998 |
| DE | 197 42 670 A1 | 4/1999 |
| EP | 0453 203 A2 | 10/1991 |
| EP | 0656 706 A2 | 6/1995 |
| EP | 0 683 756 A1 | 11/1995 |
| EP | 0 785 645 A1 | 7/1997 |
| EP | 0 817 418 A1 | 1/1998 |
| EP | 0 933 903 A2 | 8/1999 |
| FR | 2 721 778 | 12/1995 |
| GB | 2 319 703 A | 5/1998 |
| WO | 95/20848 | 8/1995 |
| WO | 99/17511 | 4/1999 |

OTHER PUBLICATIONS

Kammeyer, Nachrichtenübertragung, Stuttgart: B.G. Teubner, second ed., 1996, pp. 7, 431-438.

Tuifel, "Multiträgerkonzepte für die digitale, terrestrische Hörerrundfunk-Übertragung", Thesis at the Technical University Hamburg-Hamburg, Feb. 1993, p. 7.

Bingham, "Multicarrier Modulation for Data Transmission: An Idea Whose Time Has Come", IEEE Communications Magazine, May 1990.

Stüber, "Modulation Methods", *Wireless*, 1997, pp. 1353-1366.

Von Karl Dirk Kammeyer et al, "Synchronization Problems in Digital Multicarrier Systems", 2213 *Frequenz*, 47 (1993) Mai/Juni, No. 5/6, Berlin, DE, pp. 159-166.

Cimini, Jr, "Analysis and Simulation of a Digital Mobile Channel Using Orthogonal Frequency Division Multiplexing", IEEE Transaction on Communications, vol. COM-33, No. 7, Jul. 1985, pp. 665-675.

Matic et al, "OFDM Synchronisation Based on the Phase Rotation of Sub-Carriers", VTC 2000-Spring 2000, IEEE 51$^{st}$ Vehicular Technology Conference, New York, NY, IEEE, US, vol. 2 of 3, Conf. 51, 2000, pp. 1260-1264.

* cited by examiner

4 DIFFERENT SIGNAL POINTS OF ONE CARRIER

MC-SYS

1st ASPECT OF THE INVENTION

1st ASPECT OF THE INVENTION

1st EMBODIMENT

2nd ASPECT OF THE INVENTION

2nd ASPECT OF THE INVENTION

2nd EMBODIMENT

3rd EMBODIMENT

FREQUENCY TRACKING DEVICE FOR A RECEIVER OF A MULTI-CARRIER COMMUNICATION SYSTEM

FIELD OF THE INVENTION

The invention relates to a frequency tracking device for a receiver of a multi-carrier communication system. The frequency tracking device evaluates and corrects frequency deviations which are introduced into multi-carrier symbols when they are transmitted between a transmitter multi-carrier filter bank and a receiver multi-carrier filter bank. These multi-carrier symbols are generated in the transmitter and are decoded in a receiver by using multi-carrier modulation/demodulation techniques.

Multi-carrier modulation/demodulation techniques considered by the present invention are those of the general class relating to Orthogonal Frequency Division Multiplexing (OFDM), Quadrature Phase Shift Keying (QPSK), Differential Quadrature Phase Shift Keying (DQPSK) (here the problem of frequency tracking only occurs when a coherent demodulation is used), Quadrature Amplitude Modulation (QAM) such as 4QAM, 16QAM and 32QAM. As for example described in reference [1] by J. Bingham, "Multi-carrier Modulation for Data Transmission: An Idea Whose Time Has Come", in IEEE Trans. on Communications, vol. 28, pp. 5–14, May 1991, the common feature of all multi-carrier modulation/demodulation schemes such as those mentioned before is that an input bit stream generated by a source is input to a multi-carrier filter bank in which respective sets of bits are used to modulate separate carriers (carrier frequencies) which are distributed over a usable frequency band. Each carrier frequency modulated by the set of bits (i.e. a data symbol) can be represented in the complex plane by a subcarrier having a particular frequency and phase due to the modulation.

FIG. 1—1 shows the signal points of one subcarrier in the complex plane when each subcarrier is modulated with only two bits as an example. $C_{01}$, $C_{00}$, $C_{10}$, $C_{11}$ denote the multi-carrier symbols generated in the transmitter. These are the multi-carrier symbols which must be decoded on the receiver side. However, as can be seen from FIG. 1—1, the received multi-carrier symbols $Y_{00}$, $Y_{01}$, $Y_{10}$, $Y_{11}$ do not necessarily coincide with the transmitted multi-carrier symbols e.g. due to a phase rotation. Furthermore, the length of the desired values C and the received values Y may also be different, e.g. due to attenuation effects. The deviation is mainly due to the fact that the symbol rate and/or the sample rate in the transmitter and the receiver are not fully synchronized. Other effects which may lead to a phase rotation in complex plane are frequency deviations which occur during the transmission from the transmitter multi-carrier filter bank to the receiver multi-carrier filter bank, e.g. due to linear and non-linear distortions on the transmission channel. However, the received multi-carrier symbols $Y_{00}$, $Y_{01}$, $Y_{10}$, $Y_{11}$ can still be decoded as the transmitted data symbols 00, 01, 10, 11 because a decoder in the receiver will evaluate the received multi-carrier symbols and/or the decoded data symbols in order to estimate the frequency offset (phase rotation) and to thus determine the transmitted data symbol. As described in WO 99/17511 by the same applicant so-called quadratic constellations can be used in order to perform an estimation process which is schematically indicated with the circles in FIG. 1—1. This is one reason why frequency tracking is necessary.

Another reason why frequency tracking is necessary is because the received signal constellation rotates in case of a frequency offset, i.e. with every multi-carrier symbol the deviation becomes larger. Once it exceeds the decision threshold, no correct data will be detected. As mentioned before, only the usage of coherent demodulation of QPSK, 8QAM, 16QAM, 64QAM etc. has a problem with this. The problem also occurs with DQPSK when it is coherently demodulated (however, normally DPSK is not coherently demodulated).

The present invention in particular addresses the problem how the frequency deviation introduced into the multi-carrier symbols when being transmitted between the transmitter multi-carrier filter bank and the receiver multi-carrier filter bank can be corrected on the receiver side with a frequency tracking device. Although the explanations below specifically relate to a OFDM system with coherent modulation, the ideas of the invention can be applied to any multi-carrier system as in principle described above.

BACKGROUND OF THE INVENTION

FIG. 1-2 shows a typical multi-carrier communication system MC-SYS using OFDM. A source 1 generates a digital bit stream which is encoded by the channel coder 2. The signal mapper 3 maps the encoded bits output by the channel coder 2 onto n sub-carriers. Thus, the output $d_n(i)$ of the signal mapper 3 constitutes the transmitted data symbols mapped onto the subcarrier n. i is the symbol/time index. One of the specific OFDM elements is the transmitter multi-carrier filter bank 4 which carries out an Inverse Fast Fourier Transform IFFT. The outputs of the filter bank 4 are the multi-carrier symbols to be transmitted from the transmitter TR to the receiver RC via a dispersive channel 6. A guard band adjustment unit 5 is provided for introducing a guard interval in order to avoid inter-symbol interference.

On the receiver side RC a removal unit 7 for the guard interval is provided and the receiver multi-carrier filter bank 8 performing a Fast Fourier Transform FFT on the received multi-carrier symbols (from which the guard interval has been removed) outputs the received data symbols. The outputs $X_{rec,n}(i)$ of the receiver filter bank 8 are the data received on the n-th subcarrier of the i-th OFDM data symbol.

A channel estimator 12 performs an estimation of the channel and the output $C_{est,n}(i)$ constitutes the channel coefficient of the n-th subcarrier. The channel coefficients are used in a metric calculator 9 to compensate the effects of the dispersive channel in the received data symbols. The decoder 10 performs the channel decoding and a received bit stream is output to the sink 11.

As shown in FIG. 1-2, anywhere between the transmitter filter bank 4 and the receiver filter bank 8 each time domain sample (multi-carrier symbol) may be subject to a frequency offset $f_{off}$ and noise n. Although in FIG. 1-2 the frequency offset and the noise n are illustrated with a multiplier 6' and an adder 6" between the channel 6 and the receiver RC units, it may be noted that such frequency offsets and the addition of noise can occur anywhere in the receiver RC and not necessarily only on the actual channel 6 during transmission. In case of a frequency offset $f_{off}$ as schematically illustrated with the multiplier 6' each time domain sample k is rotated by $e^{jk\Delta\phi}$, wherein $\Delta\phi = 2\pi f_{off} T_s$. $T_s$ is the sampling time of the FFT operator in the FFT receiver filter bank 8. Thus, the data received on the n-th subcarrier of the i-th OFDM symbol can be represented as follows:

$$X_{rec,n}(i) = d_n(i)C_n(i)e^{ji(N+G)\Delta\varphi}si\left(N\frac{\Delta\varphi}{2}\right) + \underbrace{ICI_n(i) + n_n(i)}_{n'_n(i)} \quad (1)$$

$d_n(i)$ transmitted data, mapped onto subcarrier n
$C_n(i)$ channel coefficient on subcarrier n
N number of sub-carriers
G number of samples of guard interval $$si\left(N\frac{\Delta\varphi}{2}\right)$$

damping due to frequency mismatch; for $f_{off}NT_s<5\%$ it is ≈1 and can thus be neglected here
$ICI_n(i)$ intercarrier interference on subcarrier n; its exact value depends on the offset as well as the signals and channel coefficients of all sub-carriers other than n
$n_n(i)$ additive noise on subcarrier The intercarrier interference $ICI_n(i)$ and the additive noise $n_n(i)$ can be combined to one noise term $n'_n(i)$. Thus, the rotation $$i\phi = i(N+G)\Delta_\phi \quad (2)$$

of the received signal depends on the time (symbol) index i only but not on the subcarrier n. This means that the rotation iΦ is the same for all N data signals received within one OFDM symbol. Equation (1) can be rewritten to:

$$X_{rec,n}(i) = d_n(i)C_n(i)e^{i i\phi}v_n(i)e^{j\phi_{n,n}(i)} \quad (3)$$

$V_n(i)$ magnitude of transformed noise $n'_n(i)$, depending also on data and channel coefficient
$\Phi_{n,n}(i)$ equivalently transformed phase of noise $n'_n(i)$ The phase of the received signal $X_{rec,n}(i)$ is thus $$\phi_{rec,n}(i) = \phi_{dn}(i) + \phi_{Cn}(i) + i\Phi + \Phi_{n,n}(i) \quad (4)$$

As can be seen from equation (4) the phase $\phi_{rec,n}(i)$ of the received signal (per data symbol i) depends on various terms such as the phase of the transmitted data $d_n(i)$, the phase of the channel coefficient $C_n(i)$, the phase Φ which is a result of the frequency offset and the phase $\Phi_{n,n}(i)$ dependent on the noise. A frequency tracking device FTD (as shown with examples in FIGS. 2, 3) must therefore determine a phase estimate $\Phi_{est}(i)$ which can then be used in a discrete PLL (Phase Locked Loop) tracking scheme in order to cancel out the introduced frequency offset.

For example, in a single carrier system as presented in reference [2] "K.-D. Kammeyer, Nachrichtenübertragung, Stuttgart: B. G. Teubner, second ed., 1996", when assuming a non-dispersive channel and additive noise, the transmitted single carrier data d(i) (i is again the symbol index) experiences an additive noise n(i) and a phase rotation with iΦ before being received as $X_{rec}(i)$ (in this case the number of sub-carriers n=1). In this single carrier system the phase of the product of $X_{rec}(i)$ and the conjugate complex of its decided value $d_{dec}{}^*(i)$ represents the phase estimate $\Phi_{est}(i)$ The frequency tracking device FTD therefore always consists of a first part for estimating the frequency offset (the phase estimate) and a second part consisting of the correction of the offset. This is generally only true for single carrier systems but also for multi-carrier systems such as OFDM.

Published Prior Art Documents

Due to its good characteristics in wireless transmission systems, e.g. in mobile radio communication networks, the multi-carrier system OFDM (see the aforementioned reference [1] by J. Bingham or the reference [3] by L. Cimini, "Analysis and Simulation of a Digital Mobile Channel Using Orthogonal Frequency Division Multiplexing," IEEE Trans. on Communications, vol. COM-33, pp. 665–675, July 1985) has been chosen as the transmission concept in the standardization of the HIPERLAN/2 (High Performance Radio Local Area Network). In contrast to the Digital Audio Broadcasting Standard (DAB), where OFDM is combined with a non-coherent DQPSK signal mapping—the HIPERLAN/2 employs a coherent signal mapping (modulation/demodulation). This allows in principle a better performance for the price of needing a channel estimation and of having to track the frequency in order to correct the frequency offsets. Amongst the various multi-carrier communication techniques as mentioned above OFDM in particular reacts sensitively to frequency deviations as these deviations cause a loss of the subcarrier orthogonality on which the functionality of OFDM is based. As explained above, this results in intercarrier interference (ICI) and a rotation of the signal constellation. The rotation is (for small offsets) without effect if OFDM is used with non-coherent demodulation (note that non-coherent demodulation is always combined with DQPSK).

However, for coherent demodulation (coherent signal mapping) even small offsets prove fatal for long enough transmission bursts because as soon as the accumulated rotation has exceeded the decision grid of the signal constellation a correct data detection is completely impossible. Thus, it is important to implement a precise, little complex frequency tracking which functions in the best case without pilot carriers to avoid additional computational overhead and with it a loss of transmission rate or bandwidth-efficiency.

As the OFDM scheme allows specifically simple approaches in the frequency domain (i.e. following the FFT inside the receiver), various methods have been presented in the published prior art based on an estimation of the frequency offset in the frequency domain only. As already explained above, a typical frequency tracking device comprises two essential parts, namely an evaluator for the frequency offset and a corrector for correcting the offset in the received multi-carrier symbols.

FIG. 2 and FIG. 3 both show examples of frequency tracking devices FTD according to the prior art and comprising an evaluator 14 and correction units 13, 13-1, 13-2. Each of the evaluators 14 determine a frequency deviation estimate $f_{off,est}$ by determining the estimated phase offset $\Phi_{est}(i)$ in the frequency domain, i.e.

$$f_{off,est} = \Phi_{est}(i)/(2\pi i) \quad (5)$$

Any evaluation algorithm used in the evaluator 14 exploits several values of one OFDM symbol by either averaging over the arguments or by generating the argument of the correlation. The evaluation algorithms for determining $\Phi_{est}(i)$ can be distinguished by that they are decision directed or pilot aided. The pilot aided methods always have the disadvantage of an additional overhead since less user data can be transmitted.

A first example being decision directed is based on a comparison of the arguments of the received data symbols $X_{rec,n}(i)$ with their decided data symbol $d_{dec,n}(i)$ and the channel coefficient $C_{est,n}(i)$. For each OFDM symbol the result is averaged over all used sub-carriers $N_{used}$. That is, for each OFDM symbol i the phase estimate can be calculated as:

$$\Phi_{est,1}(i) = \frac{1}{N_{used}} \sum_{n=0}^{N_{used}-1} \arg\{x_{rec,n}(i)(d_{dec,n}(i)C_{est,n}(i))*\} \quad (6)$$

As in the case of the single carrier system mentioned above the phase estimate $\Phi_{est,1}(i)$ is the average product of the received symbol and the conjugate complex of its decided values corrected by the channel coefficient. Such type of phase estimate $\Phi_{est,1}(i)$ is discussed in EP 0 453 203 and EP 6 567 06.

It should be noted that some of the published prior art documents have not explicitly included the channel coefficients for the evaluation of the phase estimate. The received data is equalized beforehand. Nonetheless, all of these evaluation algorithms require the knowledge of the channel coefficients in frequency selective environments, meaning that the channel estimation (which is necessary anyway in the case of coherent signal mapping) has to be performed before the frequency deviation evaluation. In the further description the channel estimate is assumed known and the aforementioned reference [1] gives an example of how the channel coefficients can be determined.

A second example to determine the phase estimate $\Phi_{est,2}(i)$ is a correlation of the received data of all sub-carriers with the decided data and the channel coefficients of all (used) sub-carriers. This second type of phase estimate can be calculated in accordance with the following equation:

$$\Phi_{est,2}(i) = \left\{ \sum_{n=0}^{N_{used}-1} x_{rec,n}(i)(d_{dec,n}(i)C_{est,n}(i))* \right\} \quad (7)$$

In contrast to equation (6), the second example of the phase estimate in accordance with equation (7) does not sum up the arguments of the received data multiplied with the channel estimate corrected decided data but it is based on taking the argument of the summed up (summed up over the number of used sub-carriers) of the received data multiplied with the channel coefficient corrected decided data.

A third example for determining a phase estimate $\Phi_{est,3}(i)$ uses received pilot data together with the channel coefficients and the sent pilot data. For one OFDM symbol the result is averaged over all pilot carriers $N_{pilot}$ of that symbol. The third example of the phase estimate is calculated in accordance with the following equation:

$$\Phi_{est,3}(i) = \frac{1}{N_{pilot}} \sum_{n=0}^{N_{pilot}-1} \arg\{x_{rec,n}(i)(p_n(i)C_{est,n}(i))*\} \quad (8)$$

where $p_n(i)$ is the pilot symbol on the n-th pilot symbol carrying subcarrier.

The following fourth example of a phase estimate $\Phi_{est,4}(i)$ is using the received pilot data in a correlation with the channel coefficient and the sent pilot data, similarly as was done for the data symbol evaluation in equation (7). That is, a correlation of the received pilot data with the channel coefficient and the sent pilot data can be calculated in accordance with the following equation:

$$\Phi_{est,4}(i) = \arg\left\{ \sum_{n=0}^{N_{pilot}-1} x_{rec,n}(i)(p_n(i)C_{est,n}(i))* \right\} \quad (9)$$

Each of the following publications use either the third or fourth example for determining the phase estimate: EP 6 835 76; EP 7 856 45; DE 197 218 64; GB 2 319 703; DE 197 530 84; and EP 8 174 18.

To simplify the implementation all "arg(x)"-functional expressions can (in case of small frequency offsets) be replaced by simply using the imaginary part Imag (x).

Any of the aforementioned four examples in equations (6)–(9) can be used in the evaluators arranged as shown in FIG. 2, FIG. 3. In case of using a decision directed frequency estimation N in FIGS. 2, 3 denotes the number of used sub-carriers $N_{used}$ and in case of pilot aided phase determination N denotes the number of used pilot carriers $N_{pilot}$.

FIG. 2 shows a first example of a correction unit 13 arranged upstream of the receiver multi-carrier filter bank 8. On the basis of the frequency deviation estimate $f_{off,est}$ determined by using equation (5) and the sample index (k) within the multi-carrier symbol each received multi-carrier symbol is rotated with a different phase shift. That is, in FIG. 2 the correction of the offset is performed in a feedback loop before the FFT unit 8. Such type of correction is used in the aforementioned patent documents. In fact, this type of correction is a straightforward rotation of each incoming sample of the i-th multi-carrier symbol with a value which has been obtained from the offset estimates of the symbols at an adjustment time interval before. That is, since the multi-carrier symbols evaluator 14 operates on the set of multi-carrier symbols received at a last symbol duration and the correction with the frequency offset estimation $f_{off,est}$ is carried out on the next set of arriving multi-carrier symbols.

FIG. 3 shows a further example of a corrector which uses instead of the correction unit 13 in FIG. 2 or in addition to the correction unit 13 in FIG. 2 a correction unit 13-2 arranged downstream of the receiver multi-carrier filter bank 8. A system as in FIG. 3 is for example disclosed in reference [4] "Multiträgerkonzepte für die digitale, terrestrische Hörerrundfunk-Übertragung" by Ulrich Tuifel; PhD, Thesis at the Technical University Hamburg-Harburg, February 1993. Arranging the correction unit 13-2 downstream of the receiver multi-carrier filter bank 8 all data symbols output by the multi-carrier filter bank are rotated with the same phase shift depending on frequency deviation estimate $f_{off,est}$. However, although in the correction unit 13-2 the samples of the i-th symbols are corrected with the value which is derived from the frequency offset estimate of the previous symbols. In contrast to the correction unit 13-1, where each sample of one symbol is corrected with a different incremented value, the correction unit 13-2 rotates each sample of one symbol with the same value. In FIGS. 2, 3 it should be noted that the frequency tracking device FDD includes all units shown with the exception of the multi-carrier filter bank 8.

Disadvantages of the Published Prior Art

As can be seen from equations (6), (8), the phase estimates $\Phi_{est,1}$ and $\Phi_{est,3}$ are based on the summing up of the arguments of the received data with their decided data corrected by the channel coefficients (8) $X_{rec,n}(i)$ denotes the received pilot data on the n-th sub-carrier of the i-th symbol. Since the first and third examples of the phase estimates therefore do not process probability information, in frequency selective environments the data transmitted on the sub-carriers with small channel coefficients (where noise badly distorts the received signal), is equally weighted as the data on sub-carriers with large channel coefficients, where the influence of the noise is small and where thus, in case of the example 1, false decisions are less likely. Since the second and fourth phase estimates are based on a processing of probability information and inherently weight the sub-carriers with the channel coefficients, the performance can be improved. Although sub-carriers with small channel coefficients are not weighted as much, they can distort the phase estimate due to false decisions in case of a decision directed approach in the second example.

In case of the pilot aided third and fourth examples, the number of pilot carriers has to be chosen large enough to ensure a good averaging process and with it a good estimate. Due to the large number of pilot carriers necessary to obtain a good averaging process the computational overhead is undesirably increased.

Another disadvantage, already mentioned above, is that the correction performed in FIG. 2 and FIG. 3 is time-shifted (delayed), meaning that the evaluation data of one symbol i is used to correct the data of the next symbol i+1 (or that the actual symbol i is corrected with a value from the previous estimate i−1). This results in a residual error which degrades the performance.

SUMMARY OF THE INVENTION

As described above, the conventional frequency tracking devices, in particular for coherent OFDM, possess the major disadvantages that either the phase estimate and thus the frequency deviation estimate does not correctly represent the actual frequency deviation or that the more accurate determination of the frequency deviation requires a large computational overhead. Furthermore, there is the disadvantage that the correction is delayed, i.e. that a present set of data symbols is used for the evaluation whilst the correction is carried out for the next set of multi-carrier symbols. That is, the actually determined phase estimate and thus the frequency deviation estimate is incorrect since it is not the actual frequency deviation of the symbols which is corrected.

Thus, the object of the present invention is to provide a frequency tracking device and a frequency tracking method which can carry out an improved frequency deviation correction without using a large computational overhead.

According to a first aspect of the invention, this object is solved by a frequency tracking device (claim 1) for a receiver of a multi-carrier communication system, for evaluating and correcting frequency deviations which are introduced into multi-carrier symbols when being transmitted between a transmitter multi-carrier filter bank and receiver multi-carrier filter bank, comprising a selector adapted to receive a set of N complex data symbols output by the receiver multi-carrier filter bank and N channel coefficients corresponding to each sub-carrier as estimated by a channel estimator of said receiver, where N is the number of used sub-carriers in the multi-carrier system, and adapted to select, on the basis of the N channel coefficients, a number M of sub-carriers corresponding to the M channel coefficients having the largest absolute values, where $M \leq N$, an evaluator adapted to determine, on the basis of the M selected sub-carriers and their corresponding M channel coefficients, an estimate of the frequency deviation introduced into the multi-carrier symbols, and a corrector for correcting the yfrequency deviation introduced into the multi-carrier symbols on the basis of the determined frequency deviation estimate According to the first aspect of the invention, the above-mentioned object is also solved by a method (claim 16) for evaluating and correcting frequency deviations which are introduced into multi-carrier symbols when being transmitted between a transmitter multi-carrier filter bank and receiver multi-carrier filter bank, comprising the steps of determining, in a receiver of a multi-carrier communication system, a set of N complex data symbols output by the receiver multi-carrier filter bank and N channel coefficients corresponding to each sub-carrier as estimated by a channel estimator of said receiver, where N is the number of used sub-carriers in the multi-carrier system; and selecting, on the basis of the N channel coefficients, a number M of sub-carriers corresponding to the M channel coefficients having the largest absolute values, where $M \leq N$, determining, on the basis of the M selected sub-carriers and their corresponding M channel coefficients, an estimate of the frequency deviation introduced into the multi-carrier symbols, and correcting the frequency deviation introduced into the multi-carrier symbols on the basis of the determined frequency deviation estimate.

In accordance with the first aspect of the invention, instead of using all sub-carriers for the evaluation in the evaluator, only the data transmitted on sub-carriers with large channel coefficients are used for the evaluation. If the evaluator uses a phase estimation in accordance with the above first (or third) example the selection of sub-carriers by the selector in accordance with the invention considerably increases the tracking range. If the evaluator uses a phase estimate determination in accordance with the second (or fourth) example the computational complexity can be reduced with the same tracking range as without sub-carrier selection. If a large number of pilot carriers is available in each OFDM symbol and a selection of sub-carriers is made then also the phase deviation estimation in accordance with the third example leads to an increased tracking range. Likewise, in case of a large number of pilot carriers and a selection process in accordance with the invention also the phase estimate determination in accordance with the above-mentioned fourth example leads to a reduced computational complexity.

The frequency tracking device and method in accordance with the first aspect of the invention may perform, at the present adjustment time interval (for a present set of multi-carrier symbols) the selection process of sub-carriers and then keep this selection for a plurality of arriving sets of multi-carrier symbols. However, preferably the frequency tracking device and method in accordance with the first aspect can also perform an adaptive selection process, i.e. at specified adjustment time intervals a renewed selection of sub-carriers is carried out. Preferably, the adaptive selection of sub-carriers is carried out at each multi-carrier symbol duration. Thus, for each new set of arriving multi-carrier symbols a new and thus adaptive selection of sub-carriers can be performed. Thus, if for example the channel coefficients change at each adjustment time interval a more accurate phase estimate can be obtained.

The corrector for correcting the frequency deviation introduced into the multi-carrier symbols on the basis of the determined frequency deviation estimate preferably comprises a first correction unit arranged upstream the receiver multi-carrier filter bank and is adapted to rotate each received multi-carrier symbol with a different phase shift depending on the frequency deviation estimate and the sample index within the multi-carrier symbol.

Furthermore, the corrector may comprise a second correction unit arranged downstream of the receiver multi-carrier filter bank and adapted to rotate all data symbols output by the receiver multi-carrier filter bank with the same phase shift depending on the frequency deviation estimate. The second correction unit is arranged downstream of the receiver multi-carrier filter bank in such a manner that it corrects the same data symbols which are subject to the selection process in the selector. The second correction unit thus carries out the forward correction without delay after the receiver multi-carrier filter bank.

The second correction unit may be used alone or in combination with the first correction unit. Since the second correction unit first provides a phase estimate relating to the actual data symbols which are corrected by the second correction unit, i.e. not a delayed phase estimation, the second correction unit alone, i.e. even without the selector, already solves the above-mentioned object. Therefore, in accordance with a second aspect of the invention, the above-mentioned object is also solved by a frequency tracking device (claim 11) for a receiver of a multi-carrier communication system, for evaluating and correcting frequency deviations which are introduced into multi-carrier symbols when being transmitted between a transmitter multi-carrier filter bank and receiver multi-carrier filter bank, comprising an evaluator adapted to receive a set of N complex data symbols output by the receiver multi-carrier filter bank and N channel coefficients corresponding to each sub-carrier as estimated by a channel estimator of said receiver, where N is the number of used sub-carriers in the multi-carrier system, and to determine, on the basis of N sub-carriers and their corresponding N channel coefficients, an estimate of the frequency deviation introduced into the multi-carrier symbols, where N is the number of sub-carriers used in the transmitter, a corrector for correcting the frequency deviation introduced into the multi-carrier symbols on the basis of the determined frequency deviation estimate, and wherein said corrector comprises a corrector unit arranged downstream of the receiver multi-carrier filter bank and adapted to rotate all data symbols output by the receiver multi-carrier filter bank with the same phase shift depending on the frequency deviation estimate.

Furthermore, in accordance with the second aspect of the invention, the above-mentioned object is also solved by a method (claim 20) for evaluating and correcting frequency deviations which are introduced into multi-carrier symbols when being transmitted between a transmitter multi-carrier filter bank and receiver multi-carrier filter bank, comprising the steps of determining, in a receiver of a multi-carrier communication system, a set of N complex data symbols output by the receiver multi-carrier filter bank and N channel coefficients corresponding to each sub-carrier as estimated by a channel estimator of said receiver, where N is the number of used sub-carriers in the multi-carrier system, and determining, on the basis of N sub-carriers and their corresponding N channel coefficients, an estimate of the frequency deviation introduced into the multi-carrier symbols, where N is the number of sub-carriers used in the transmitter, and correcting the frequency deviation introduced into the multi-carrier symbols on the basis of the determined frequency deviation estimate, and wherein said correction step comprises a correction carried out downstream of the receiver multi-carrier filter bank in which all data symbols output by the receiver multi-carrier filter bank are rotated with the same phase shift depending on the frequency deviation estimate.

Preferably, the frequency tracking device and method in accordance with the second aspect of the invention may be used together with the first correction unit and/or the selector.

Further advantageous embodiments and improvements of the invention are listed in the dependent claims. Furthermore, it should be noted that the invention is not restricted to the embodiments and examples described in the present specification and that further advantageous embodiments and improvements may be obtained by combining features which have been separately described in the description and/or the claims.

BRIEF DESCRIPTION OF THE DRAWINGS

FIG. 1-2 shows a block diagram of a multi-carrier system MC-SYS including a multi-carrier transmitter TR and a multi-carrier receiver RC in accordance with the prior art;

FIG. 2 shows a frequency tracking device FTD in accordance with the prior art where a correction unit is place upstream of the receiver multi-carrier filter bank;

FIG. 4-1 shows a frequency tracking device FTD in accordance with the first aspect of the invention;

FIG. 4-2 shows a frequency tracking method in accordance with the first aspect of the invention;

FIG. 6-1 shows the frequency tracking device FTD in accordance with the second aspect of the invention where a correction unit is placed downstream of the receiver multi-carrier filter bank and where the correction unit operates on the same data symbols which are subject to the evaluation carried out in the evaluator;

FIG. 6-2 shows a flow chart of a method in accordance with the second aspect of the invention relating to the frequency tracking device FTD shown in FIG. 6-1.

Figure 1:
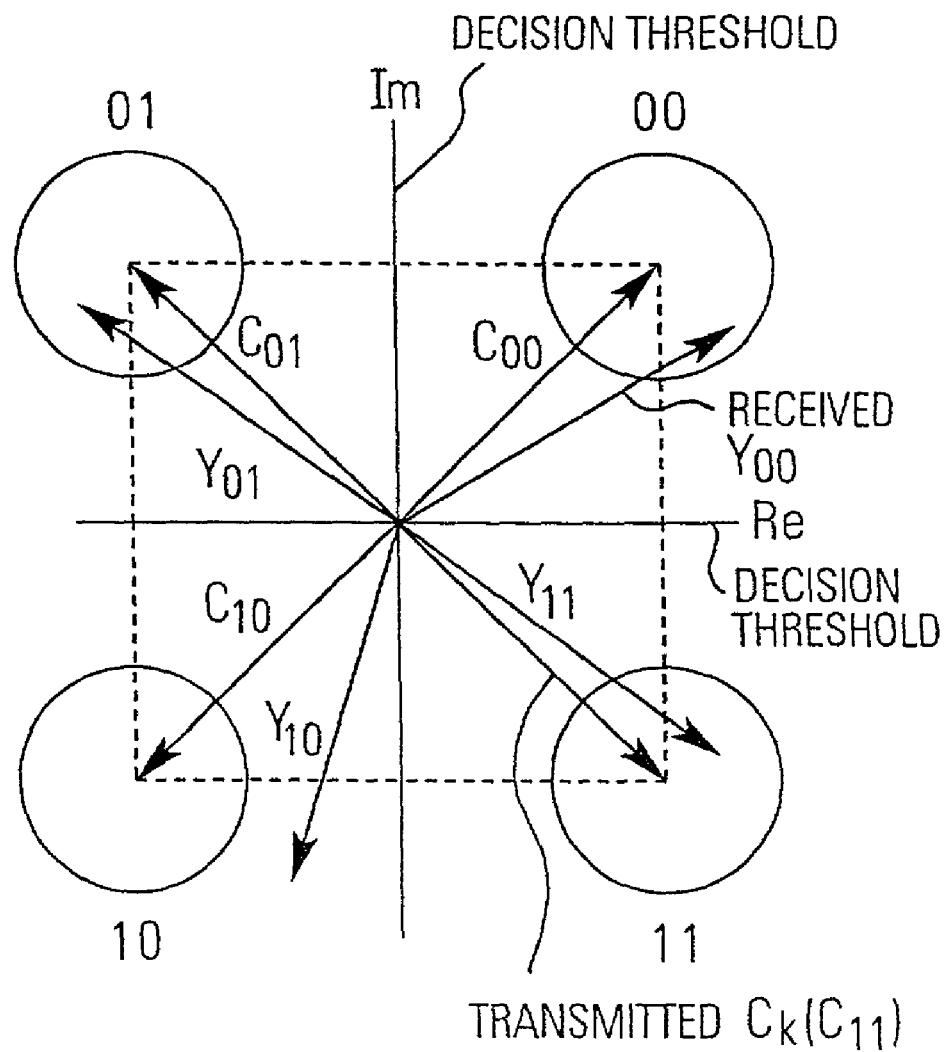
FIG. 1—1 shows an example of a multi-carrier demodulation using four data symbols for one carrier in accordance with the prior art.

Hereinafter, a frequency tracking device in accordance with the first and second aspect of the invention will be described with reference to their advantageous embodiments by referring to the accompanying drawings. In the drawings and in the description the same or similar reference numerals and the same or similar denotations refer to the same parts and units throughout the description.

Furthermore, it should be noted that hereinafter the aspects of the invention are explained with particular reference to the special case of an OFDM multi-carrier communication system. However, the inventive teaching may equally well be applied to any other type of multi-carrier system as described above, such as a DQPSK, QPSK or QAM multi-carrier communication system. For example, the IFFT unit 4 and the FFT unit 8 shown in figures only illustrate the example case of the transmitter and receiver filter bank for OFDM. For other multi-carrier systems the filter banks can some additional processings in addition to the IFFT and FFT units.

First Aspect of the Invention

Figure 3:
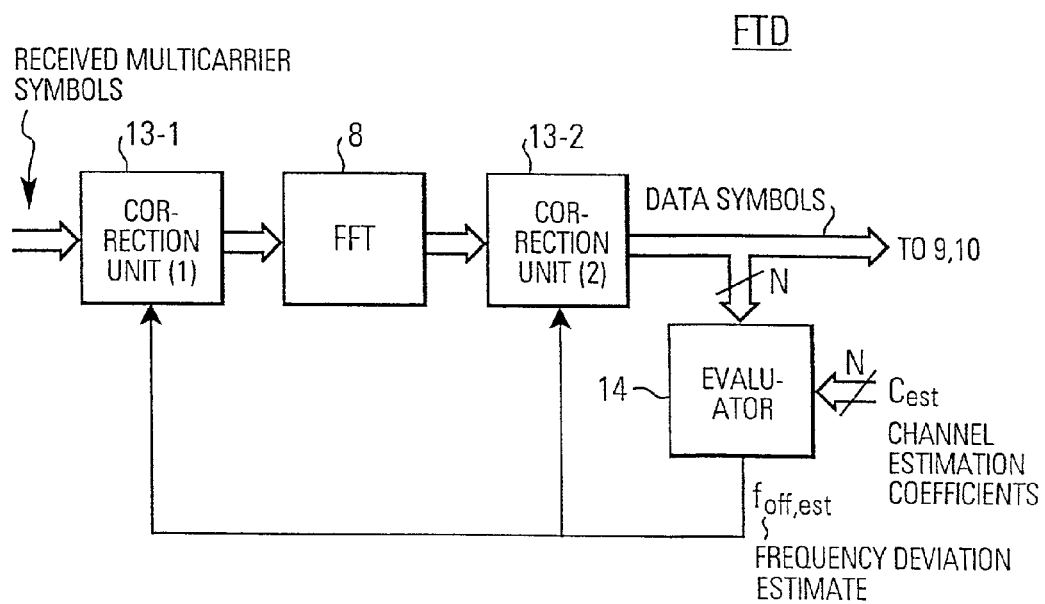
FIG. 3 shows a frequency tracking device FTD where a first and second correction unit is placed upstream and downstream of a receiver multi-carrier filter bank, respectively, in accordance with the prior art.
Figures 1, 4:
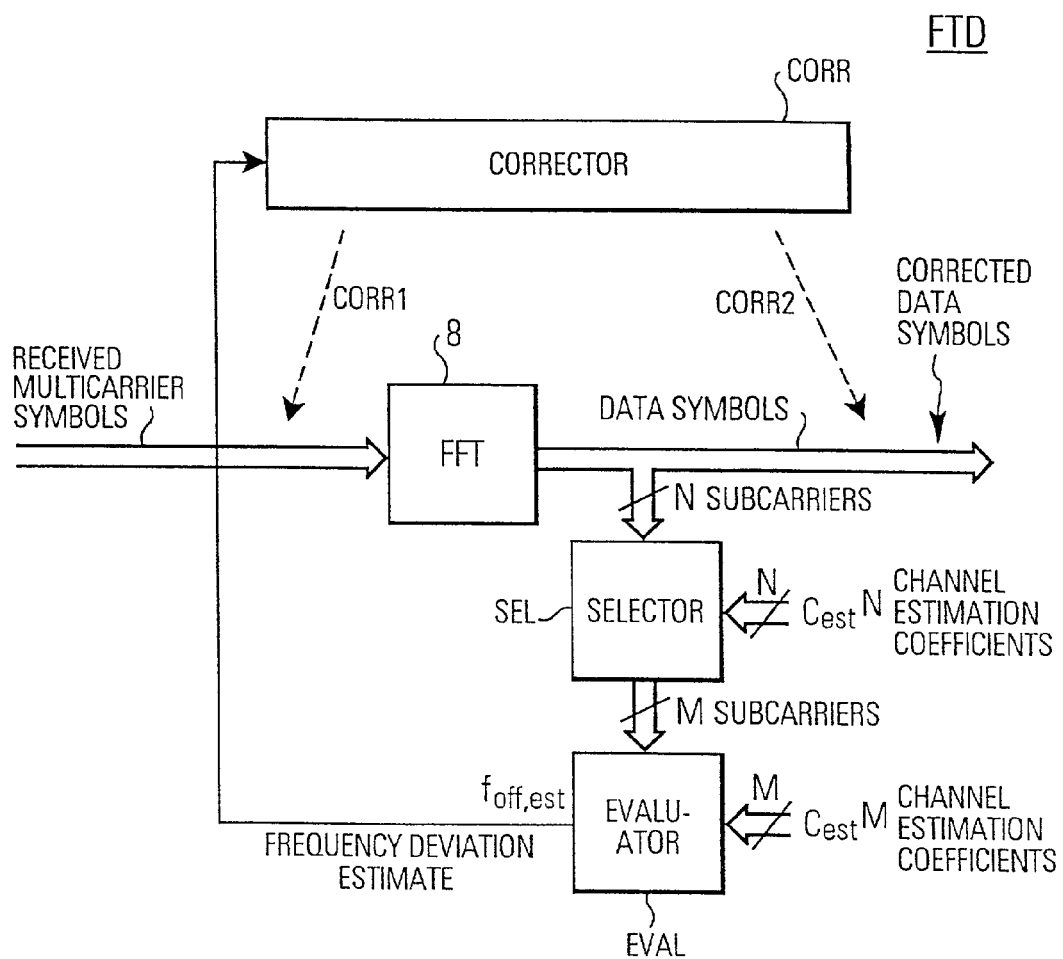
Figures 2, 4:
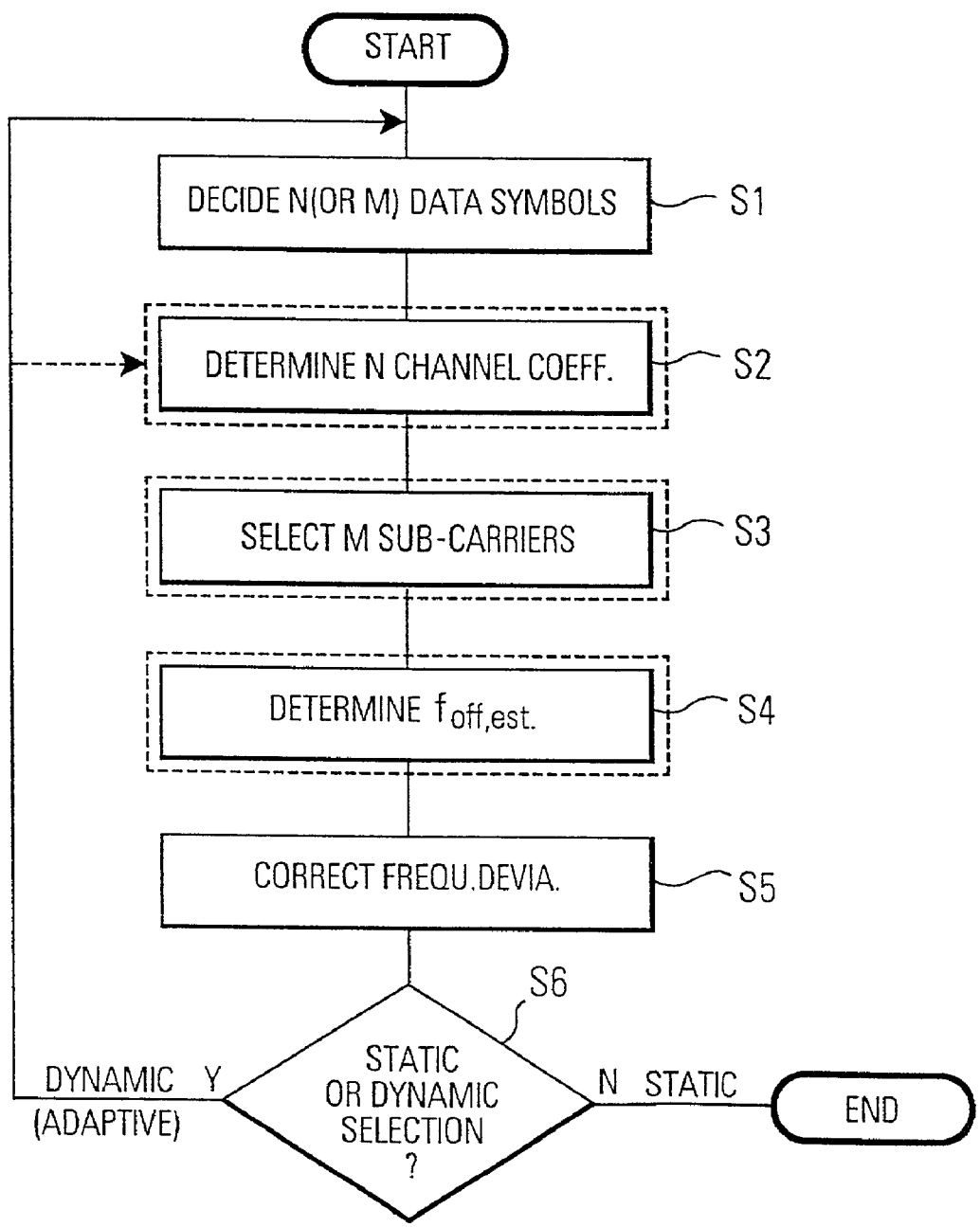

FIG. 4-1 shows a block diagram of a frequency tracking device FTD in accordance with the first aspect of the invention. Such a frequency tracking device FTD is incorporated in a multi-carrier receiver RC and can for example be incorporated in the OFDM communication system MC-SYS shown in FIG. 1-2. As in FIG. 2 and in FIG. 3 the frequency tracking device FTD comprises all units illustrated in FIG. 4-1 with the exception of the receiver multi-carrier filter bank 8 (the Fast Fourier Transform unit FFT).

As shown in FIG. 4-1, the frequency tracking device FTD of the receiver RC of a multi-carrier communication system is provided for evaluating and correcting frequency deviations $f_{off}$ which are introduced into multi-carrier symbols when being transmitted between a transmitter multi-carrier filter bank 4 (see FIG. 1-2) and the receiver multi-carrier filter bank 8.

In particular, the frequency tracking device FTD comprises Frequency tracking device FTD for a receiver RC of a multi-carrier communication system MC-SYS, for evaluating and correcting frequency deviations $f_{off}$ which are introduced into multi-carrier symbols when being transmitted between a transmitter multi-carrier filter bank 4; IFFT and receiver multi-carrier filter bank 8; FFT, comprising a selector SEL adapted to receive a set of N complex data symbols output by the receiver multi-carrier filter bank 8; FFT and N channel coefficients $C_{est}$ corresponding to each sub-carrier as estimated by a channel estimator 12 of said receiver RC, where N is the number of used sub-carriers in the multi-carrier system MC-SYS, and adapted to select, on the basis of the N channel coefficients $C_{est}$, a number M of sub-carriers corresponding to the M channel coefficients $C_{est}$ having the largest absolute values, where M≦N, an evaluator (EVAL) adapted to determine, on the basis of the M selected sub-carriers and their corresponding M channel coefficients $C_{est}$ an estimate $f_{off,est}$ of the frequency deviation $f_{off}$ introduced into the multi-carrier symbols, and a corrector CORR1; CORR2 for correcting the frequency deviation introduced into the multi-carrier symbols on the basis of the determined frequency deviation estimate $f_{off,est}$.

Therefore, in accordance with the first aspect of the invention, instead of using all N sub-carriers for the evaluation in the evaluator EVAL, only the data transmitted on the M sub-carriers with large channel coefficients are used for the evaluation. As shown in FIG. 4-1, the CORR is adapted for correcting the frequency deviation introduced in the received multi-carrier symbols on the basis of the determined frequency deviation estimate $f_{off,est}$ and the corrector CORR can correct the frequency deviation via a correction CORR1 of the received multi-carrier symbols before they are input to the FFT filter bank 8. Alternatively, the corrector CORR can perform a correction CORR2 of the data symbols output by the FFT filter bank 8. Furthermore, the corrector CORR can carry out a combined correction by carrying out both a correction CORR1 and a correction CORR2.

As was explained above with reference to FIG. 1-2, in the receiver RC of the multi-carrier communication system MC-SYS the received multi-carrier symbols are processed in the FFT filter bank 8 as discrete sets of N multi-carrier symbols. These sets of multi-carrier symbols have a specific symbol duration depending on the sample rate in the receiver RC. When the reception of multi-carrier symbols starts in the receiver RC and the FFT unit 8 for the first time outputs a set of data symbols (which are the FFT converted multi-carrier symbols) the selector SEL and the evaluator EVAL can perform an evaluation for this first set of N data symbols and then use the frequency deviation estimate $f_{off,est}$ for all subsequently received multi-carrier symbols and data symbols in a kind of static correction. However, even in this case only M sub-carriers are used for the evaluation process.

Figures 1, 2:
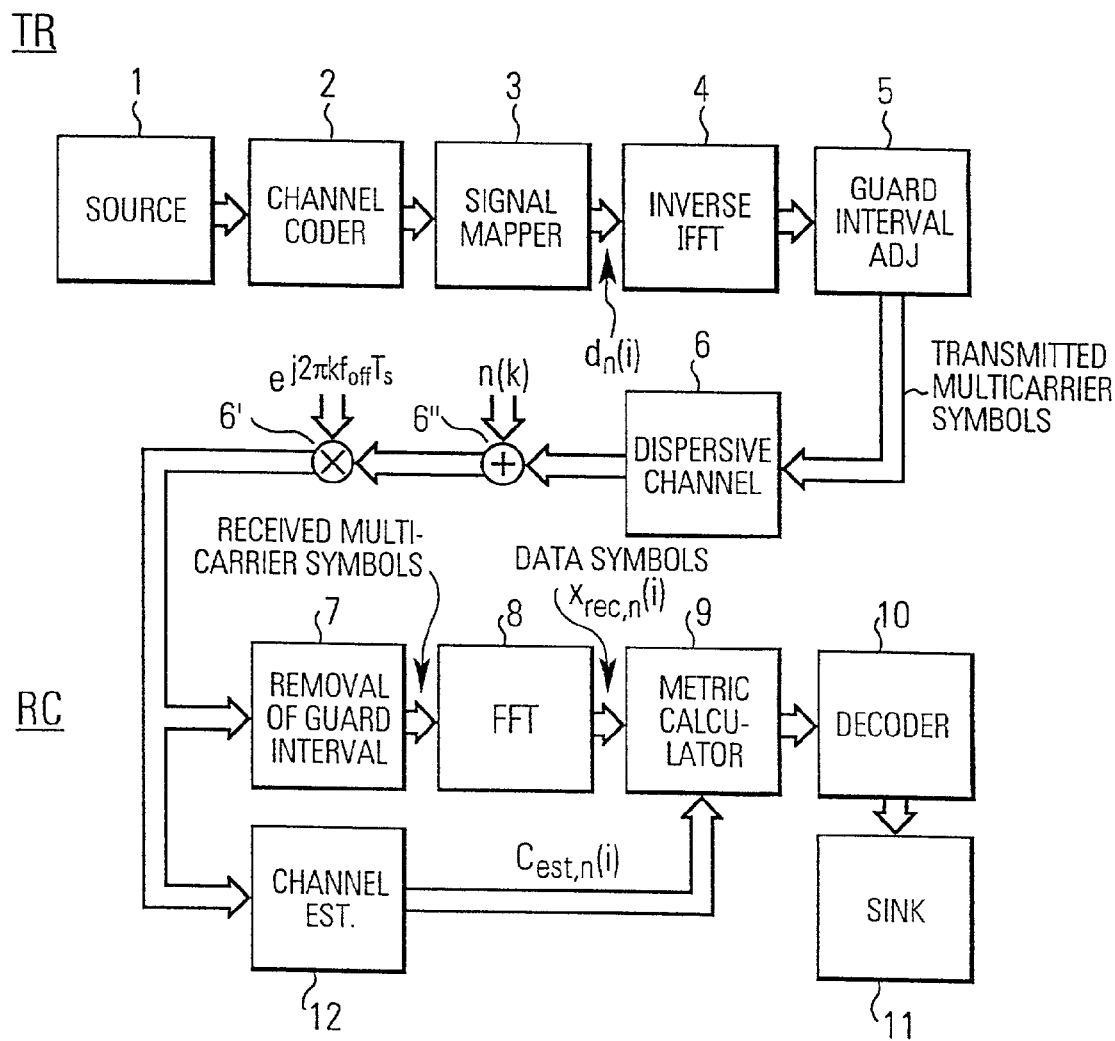
Figure 2:
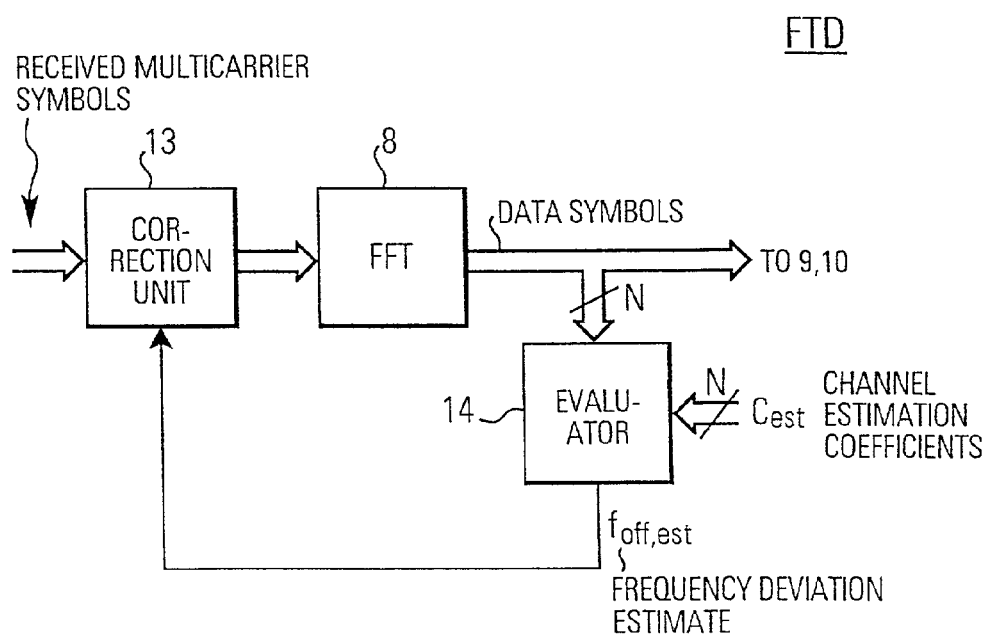

Preferably, the selector SEL and the evaluator EVAL perform their selection and evaluation processes adaptively, i.e. a new selection and evaluation process may take place for each arriving set of multi-carrier symbols/data symbols or at predetermined adjustment time intervals, e.g. only after every x sets of data symbols. The selector can also perform a monitoring of the channel coefficients $C_{est}$ which are anyway calculated by the channel estimator for each set of multi-carrier symbols. For example, as long as the selector SEL does not detect a substantial change in the magnitudes of the channel coefficients, no further selection process SEL will be carried out. If a predetermined number of the previously selected channel coefficients change to a large extent, then a new selection process will be carried out by the selector SEL. Thus, the selector SEL can adaptively adjust the number M of selected sub-carriers at adjustment time intervals including at least one multi-carrier symbol duration. By such an adaptive process the number M may change from adjustment/selection interval to the next adjustment/selection interval. Thus, the number M as well as the updating/selection frequency can change. FIG. 4-2 shows a flow chart of the method of the invention. In step S1 N (if no PSK is used) complex data symbols are determined in a receiver RC of a multi-carrier communication system NC-SYS. In the case of PSK it is not necessary to determine all N data symbols, i.e. just the data symbols of the M selected subcarriers (the selection will be explained below) will be sufficient. A set of N complex data symbols is output by the receiver multi-carrier filter bank 8, FFT shown in FIG. 4-1. In step S2 N channel coefficients are determined by a channel estimator 12 shown in FIG. 1-2. N is the number of used sub-carriers in the multi-carrier system. In step S3 the selector SEL prepares the list of channel coefficients $C_{est}(i)$ and determines the indices i of the N largest channel coefficients. The selector SEL then selects in step S3 on the basis of the N largest channel coefficients a number M of sub-carriers corresponding to the M channel coefficients having the largest absolute values, where M≦N.

In step S4 the evaluator BVAL determines on the basis of the M selector sub-carriers and the corresponding M channel coefficients an estimate $\Phi_{est,off}$ of the frequency deviation $f_{off}$ introduced in the multi-carrier symbols. For the evaluation process in the evaluator EVAL any of the above-mentioned four examples for providing phase estimates, $\Phi_{est,1}$, $\Phi_{est,2}$, $\Phi_{est,3}$, $\Phi_{est,4}$, as described with equations (6), (7), (8). (9) can be used. Whilst the first and second example evaluation processes in accordance with equations (6), (7) are a decision directed evaluation, the third and fourth example evaluation in accordance with equations (8), (9) are a pilot carrier aided evaluation for the M sub-carriers, i.e. they require the knowledge of the pilot symbols $P_n$. However, as such pilot symbols are output by the FFT filter bank 8 just as any other data symbol and therefore the selector SEL must only be provided with the indices of the sub-carriers on which the pilot symbols are transmitted. Thus, the selector SEL can also select only from the number of use pilot symbols $N_{used,pilot}$ a number of $M_{pilot}$ pilot sub-carriers in accordance with the corresponding largest channel coefficients. In case of pilot aided evaluation the sub-carriers should only be selected if the number of available pilots is large enough and when the number of pilots is small all pilot carriers should be used to ensure a good averaging process.

Furthermore, it is possible that the selector SEL selects a number of pilot carriers as well as a number of sub-carriers used for data symbols because in most cases the pilot symbols are transmitted together at least with a number of data symbols. Then the selector SEL can select $M_1$ "largest" pilot carriers and $M_2$ "largest" data symbol sub-carriers. The evaluator EVAL will then separately provide a phase estimate on a basis of a decision directed evaluation (equations (6), (7) and a pilot carrier aided evaluation (equation (8), (9).

However, the selector SEL and the evaluator EVAL can also in the case of a transmission of additional pilot carriers simply regard the pilot data symbols output by the FFT filter bank 8 just as any kind of data symbol and perform the selection process simply by selecting the M sub-carriers independently as to whether or not they are pilot sub-carriers or data symbol sub-carriers.

In step S5 the corrector CORR performs a correction of the frequency deviation $f_{off}$ on the basis of the frequency deviation estimate $f_{off,est}$ which is based on the phase estimate determined by the evaluator EVAL (see the above equation (5)). As explained above with reference to FIG. 4-1 the corrector CORR can perform a correction at the input or the output of the FFT filter bank 8. If a correction CORR1 is carried upstream of the FFT filter bank 8, then each received multi-carrier symbol is rotated with a different phase shift depending on the frequency deviation estimate $f_{off,est}$ and the sample k within the multi-carrier symbol since, as explained above with reference to equation (1), in the time domain each time domain sample k is rotated by $e^{jk\Delta\Phi}$ where k is the sample index. In case that the evaluator EVAL and the selector SEL perform a separate evaluation/selection process for a pilot carrier aided evaluation and a decision directed evaluation, two different phase estimates and consequently two different frequency deviation estimates are determined and thus the corresponding pilot multi-carrier symbols and the other multi-carrier symbols will be corrected on the basis of the respective frequency deviation estimate.

Alternatively, if the corrector CORR performs a correction CORR2 downstream of the receiver multi-carrier filter bank 8 all data symbols are output by the receiver multi-carrier filter bank 8 are corrected with the same phase shift depending on the frequency deviation estimate $f_{off,est}$. In case the pilot carrier evaluation and the decision directed evaluation are combined, the two determined phase estimates for the pilot carrier selection and the data symbol carrier selection must be combined (one example of the combining is a mere averaging) in order to obtain a single frequency deviation estimate and phase shift which is then used to correct all data symbols with the same frequency offset. If the pilot data symbols are not used for further processing in the receiver RC (for example, they may be used for adjusting the synchronization of the sample rate in the transmitter and the receiver or the channel estimate), then it is sufficient to only correct the data symbols with the averaged phase estimate.

Further preferably, the corrector COR can combine the upstream correction CORR1 and the downstream correction CORR2.

In step S6 it is determined whether a static or adaptive selection/evaluation and correction is to be carried out or not. That is, based on the first set of received multi-carrier symbols and the first set of data symbols output by the FFT filter bank 8 steps S1-S5 are carried out once and then the determined frequency deviation estimate is used for the correction of all subsequently arriving sets of received multi-carrier symbols. In this case, step S2, S3, S4 are only carried out once. Actually, also step S1 is only necessary once.

However, as explained above, also an adaptive process is possible. In this case ("Y" in step S6) the next set of N data symbols may be determined and the next set of N channel coefficients (or M channel coefficients if PSK is used) may be determined in steps S1, S2. The selection process in step S3 is repeated and a frequency deviation estimate is determined in steps S3, S4. In the non-adaptive process steps S2, S3 will not be carried out again (and therefore these steps are surrounded by a dashed line). Therefore, the adaptive process can be carried out by completely repeating the determination of a new set of N data symbols (and N channel coefficients) and carrying out a new selection of the sub-carriers. In this case step S6 loops back to step S1 in case of "Y" (as shown in FIG. 4-2).

Alternatively, other types of adaptive performance may be carried out. For example, it can be arranged that for the already received set of N multi-carrier symbols only a new set of M different sub-carriers (i.e. different to the previously selected M sub-carriers) is selected via a new set of channel coefficients. In this case, S6 loops back to step S2 in case of "Y".

As explained above, in the adaptive correction process a different number M of sub-carriers can be selected in step S3 at a next adjustment interval. For example, the selector SEL may have a range of magnitudes of channel coefficients to be selected. The number of channel coefficients $C_{est}$ falling into this range can vary from adjustment time interval to adjustment time interval. Therefore, also the number of selected sub-carriers M can change from adjustment interval to adjustment interval. The adjustment interval may be the duration of one set of multi carrier symbols or may be selected to be only every x-th multi carrier symbol set. The adaptive nature is particularly advantageous since it reduces the computational complexity such that always the smallest number of sub-carriers falling into a particular range of magnitudes are selected by the selector SEL. The selector SEL may also decide not to change the sub-carriers if the deviation of channel coefficients from the previous to the present adjustment time interval is very small, i.e. smaller than a predetermined tolerance. This adaptive process can be carried for the pilot symbol directed evaluation, the decision directed evaluation and for a combination of both types of evaluations, as explained above. Instead of using a range of magnitudes for the channel coefficients the selector SEL can also select a predetermined number of the largest channel coefficients. For example, when evaluating the channel coefficients, the number of selected sub-carriers can be $M=N/4$ to $M=N/3$ where N is the number of used sub-carriers.

If the evaluator EVAL uses the first or third example for the evaluation process (equations (6), (8)) then a particularly advantageous way how to determine the number of sub-carriers M is by minimizing the following equation (10) with respect to M as the number of sub-carriers with the largest magnitude of channel coefficients:

$$\sigma_{\phi err}^2 = \frac{\sigma_{n'}^2}{2} B_n(a) \frac{1}{M^2} \sum_{m=0}^{M-1} \frac{1}{|C_m(i)|^2 |d_m(i)|^2} \quad (10)$$

In equation (10) $C_m(i)$ are the channel coefficients estimated by the channel estimator 12. $B_n(a)$ is the noise bandwidth for a loop gain a in the PLL tracking scheme used in the correctors CORR1, CORR2 and $\sigma_{n'}^2$ is the noise variance of the additive noise. $\sigma_{\phi err}^2$ is the variance of the phase error.

If the evaluation unit EVAL uses an evaluation in accordance with the second of fourth example (equation (7), (9)), then the selector SEL can perform a selection of M subcarriers by considering the following equation:

$$\sigma_{\phi err}^2 = \frac{\sigma_{n'}^2}{2} B_n(a) \frac{1}{\sum_{m=1}^{M} |d_m(i)|^2 |C_m(i)|^2} \quad (11)$$

Whilst equation (10) has an actual minimum with respect to the minimization of M, the equation (11) is a decreasing function with respect to M. However, with increasing M the function decreases less until for very small values $C_m(i)$ almost no change will be noticeable, i.e. the gradient of this curve drastically changes at a certain number M, i.e. within the first values of M (e.g. M=1 . . . 4) equation (11) drastically decreases and the decrease is not so drastic if the value of M is further increased. Therefore, one can set a predetermined threshold for $\sigma_{\phi err}^2$ and if the values of equation (11) drop below this threshold then this corresponds to the value of M.

However, also independently of equations (10), (11) a fixed preset value for M can be used as explained above M=N/4 to M=N/3 and the selector SEL will then perform the selection of the subcarriers corresponding to the largest channel coefficients.

The use of the static selection/evaluation and correction process is advantageous for example in the HIPERLAN/2 communication system. That is, if the determination of the supposedly "good" subcarriers is only to be performed once with every channel estimate, for all the following OFDM symbols (in case of HIPERLAN/2 there may be several hundred) only a selection (⅓ to ¼) of the subcarriers must be processed. Therefore, even if a static selection of a number of subcarriers M in correlation to the channel coefficients is performed, this already drastically reduces the computational complexity and increases the accuracy of the phase estimation with above the mentioned first and second examples for the phase estimation (with the second and fourth examples the accuracy of the phase estimation remains substantially the same, however the calculation time is improved).

Thus, in case of the evaluation process in accordance with the first example (equation (6)), which is preferred for its lack of complex multiplications, the selection of subcarriers considerably increases the tracking range. If the second example of the evaluation process is used (equation (7)), the computational complexity can also be reduced with the same tracking range as without subcarrier selection. If a large number of pilot symbols is available in each OFDM symbol, this is equally valid for the evaluation processes in accordance with the third and fourth examples (equations (8), (9)).

Figure 5:
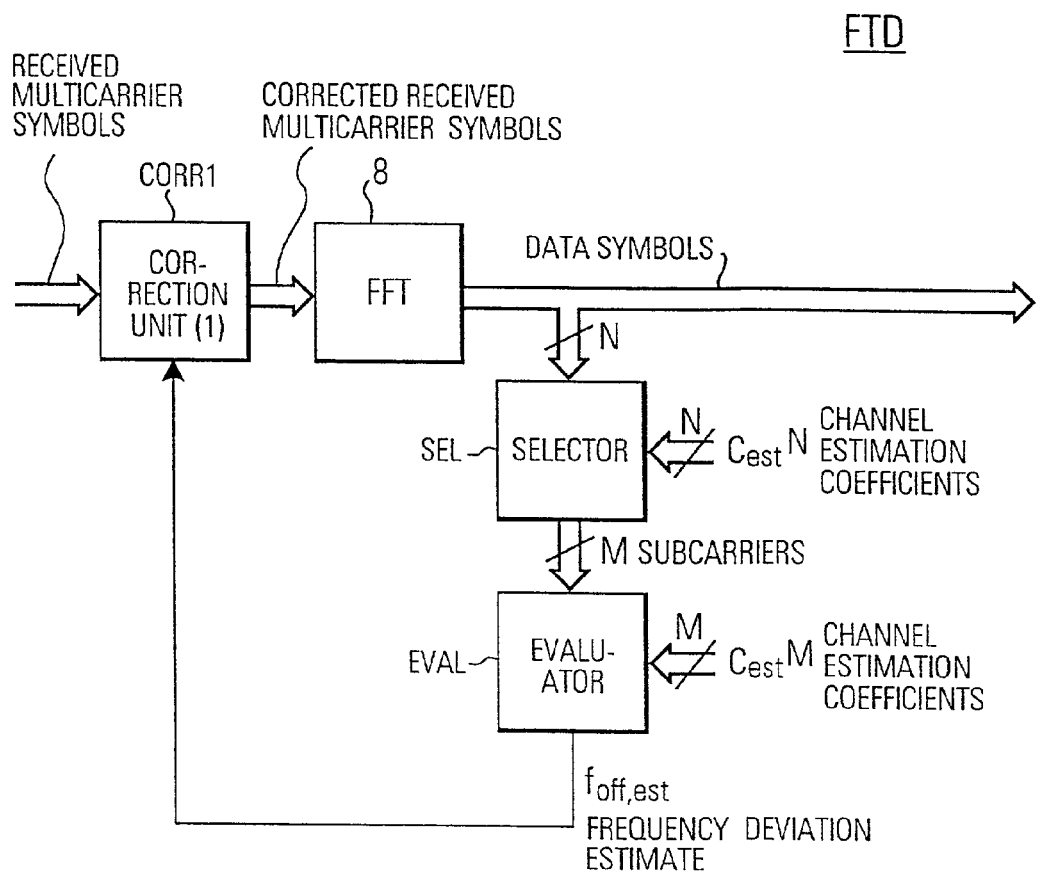
FIG. 5 shows an embodiment of the frequency tracking device FTD in accordance with the first aspect of the invention where a correction unit is placed upstream of the receiver multi-carrier filter bank.

FIG. 5 shows a first embodiment of the arrangement of a correction unit CORR1 upstream of the receiver multi-carrier filter bank 8. As discussed above, this type of correction unit CORR1 rotates each received multi-carrier symbol with a different phase shift depending on the frequency deviation estimate $f_{off,est}$ and the sample index k within the multi-carrier symbol. This type of correction unit corresponds to the already well-known prior art correction unit 13 shown in FIG. 2.

Second Aspect of the Invention

As explained above one of the disadvantages of the prior art frequency tracking device in FIG. 3 is that each of the correction units 13-1, 13-2 carry out a correction only for the "next" set of multi-carrier symbols and data symbols, respectively. That is, the evaluation in the evaluator 14 is carried out for a present set of data symbols output by the FFT filter bank and the correction can only be carried out for the subsequently arriving set of multi-carrier symbols. Therefore, the determined frequency deviation estimate $f_{off,est}$ actually relates to the incorrect set of multi-carrier symbols/data symbols.

Figures 1, 6:
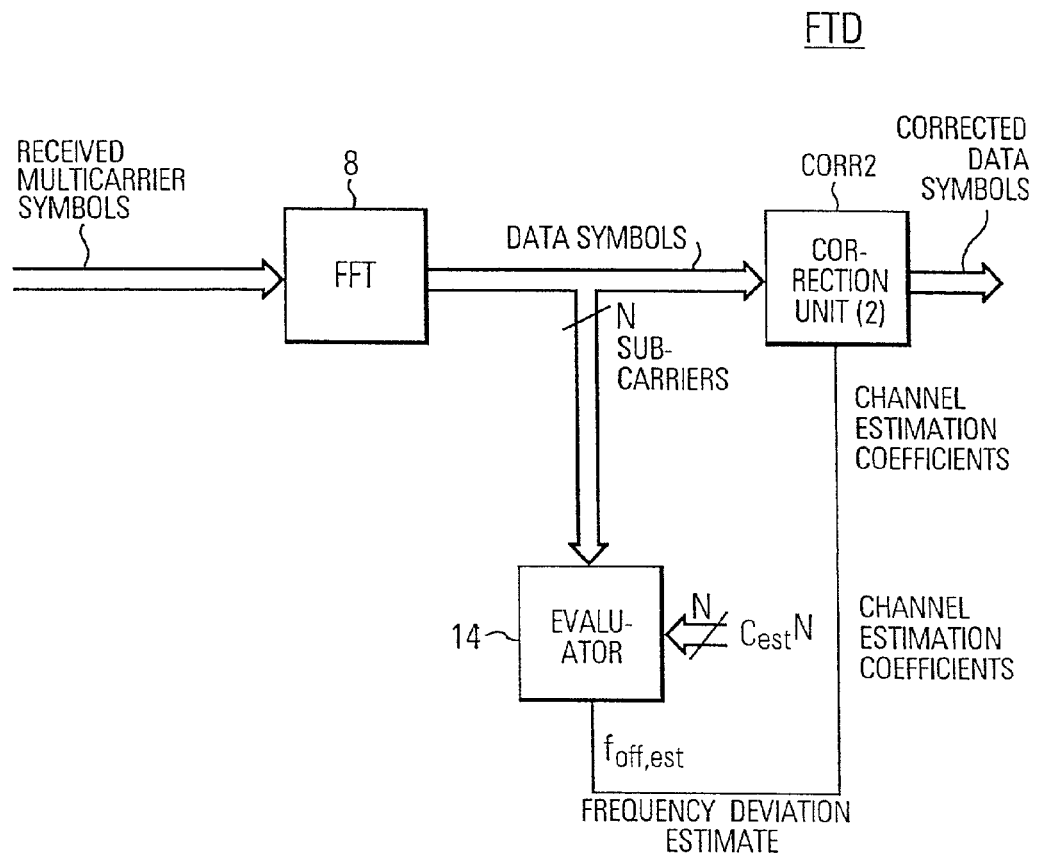
Figures 2, 6:
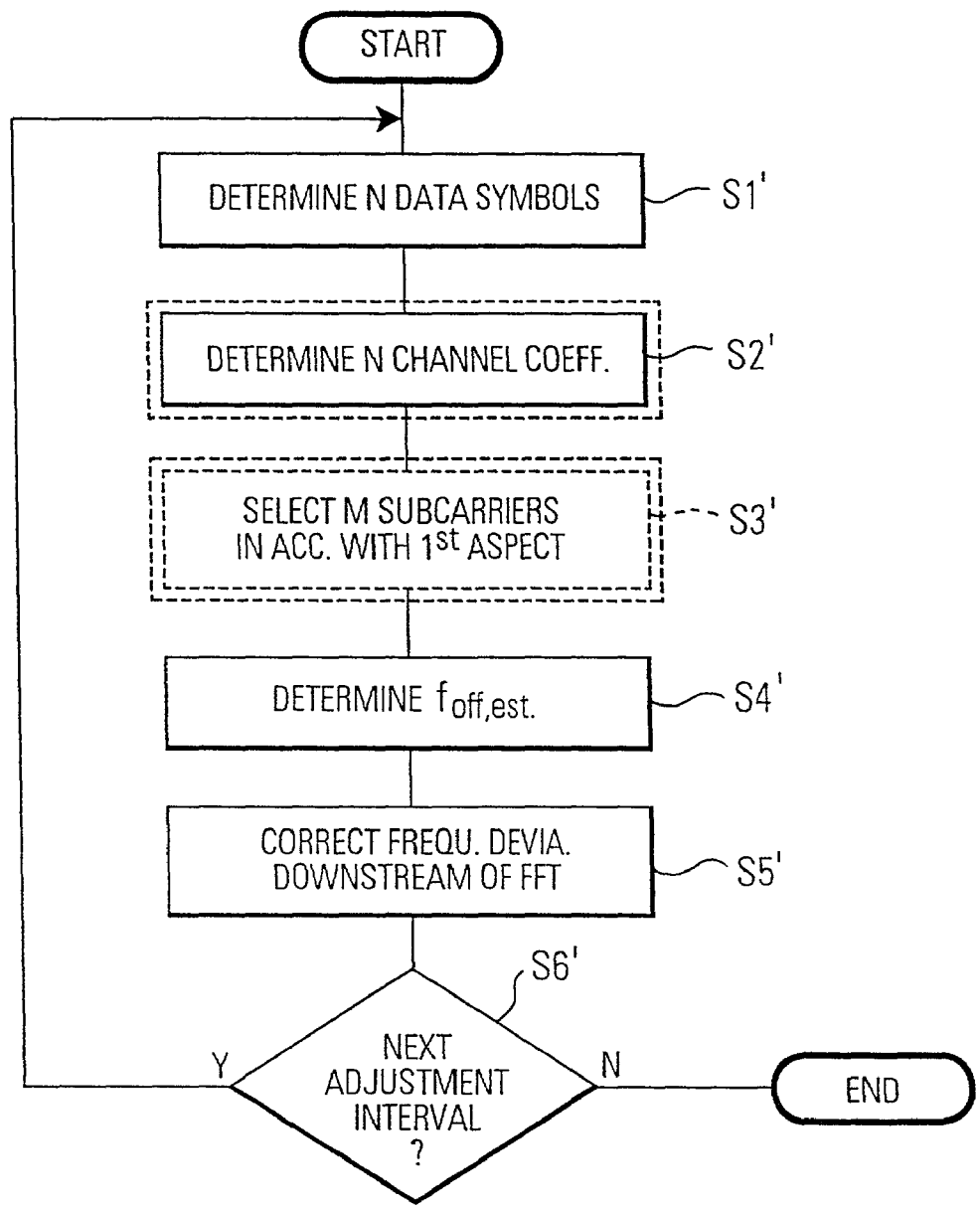

FIG. 6-1 shows a frequency tracking device FTD in accordance with a second aspect of the invention. This frequency tracking device FTD comprises an evaluator EVAL adapted to receive a set of N complex data symbols output by the receiver multi-carrier filter bank 8; FFT and N channel coefficients $C_{est}$ corresponding to each sub-carrier as estimated by a channel estimator 12 of said receiver RC, where N is the number of used sub-carriers in the multi-carrier system MCSYS, and to determine, on the basis of N sub-carriers and their corresponding N channel coefficients $C_{est}$ an estimate $f_{off,est}$ of the frequency deviation $f_{off}$ introduced into the multi-carrier symbols, where N is the number of sub-carriers used in the transmitter, a corrector CORR1; CORR2 for correcting the frequency deviation introduced into the multi-carrier symbols on the basis of the determined frequency deviation estimate $f_{off,est}$, and wherein said corrector CORR1; CORR2 comprises a corrector unit CORR2 arranged downstream of the receiver multi-carrier filter bank 8 and adapted to rotate all data symbols output by the receiver multi-carrier filter bank 8 with the same phase shift depending on the frequency deviation estimate $f_{off,est}$.

By contrast to FIG. 3 it can be seen from FIG. 6-1, that the correction of the offset is done in a forward correction manner without delay after the FFT unit 8. That is, the estimate is not fed back but is used in a forward loop to correct to offset of the data symbols which have just been evaluated in the evaluator 14, i.e. the i-th symbol is corrected with the estimate of the i-th symbol. By contrast, in the prior art frequency tracking device FTD in FIG. 3 the correction unit 13-2 only carries out a correction of the (i+1)-th data symbol. The forward correction significantly improves the performance and therefore accuracy of the evaluation process used in the evaluator 14. Any of the above mentioned evaluation processes in accordance with the first to fourth examples (equations (6)–(9)) can benefit from such a forward correction unit CORR2.

FIG. 6-2 shows a flow chart of a method in accordance with the second aspect of the invention. In this flow chart steps S1', S2', S3', S4' correspond to the steps S1–S5 in FIG. 4-2. Step ST3' may or may not be carried out depending on whether or not the first aspect of the invention is used or not. Furthermore, the double-dashed line indicates that the adaptive selection process may or may not be carried out if the flow chart in FIG. 6-2 is carried out at several distinct adjustment time intervals.

If in step S4' an estimate $f_{\textit{off,est}}$ of the frequency deviation $f_{\textit{off}}$ introduced into the multi-carrier symbols has been determined on the basis of N sub-carriers and their corresponding N channel coefficients in the evaluator 14, the frequency deviation $f_{\textit{off}}$ introduced into the multi-carrier symbols is corrected S5' on the basis of the determined frequency deviation estimate $f_{\textit{off,est}}$. In particular, the correction step S5' comprises a correction CORR2 carried out downstream of the receiver multi-carrier filter bank and the correction is carried out in such a manner that all data symbols output by the receiver multi-carrier filter bank 8 are rotated with the same phase shift depending on the frequency deviation estimate. In particular, the evaluator 14 operates, as shown in FIG. 6-1, on the data symbols which have as yet not been corrected at a downstream position of the FFT unit 8. Thus, the correction unit CORR2 and the evaluator 14 operate on the same data symbols and therefore a forward correction can be carried out for respective data symbols.

Of course, the frequency tracking device FTD shown in FIG. 6-1 can be combined with another correction unit 13-1, CORR1 provided at the input of the FFT filter bank 8. Then, the correction unit CORR2 and the evaluator 14 operate on the same data symbols again, however, the data symbols are the FFT transformed multi-carrier symbols which have already been corrected once in the feedback correction unit 13-1.

Further Aspects of the Invention

Figure 7:
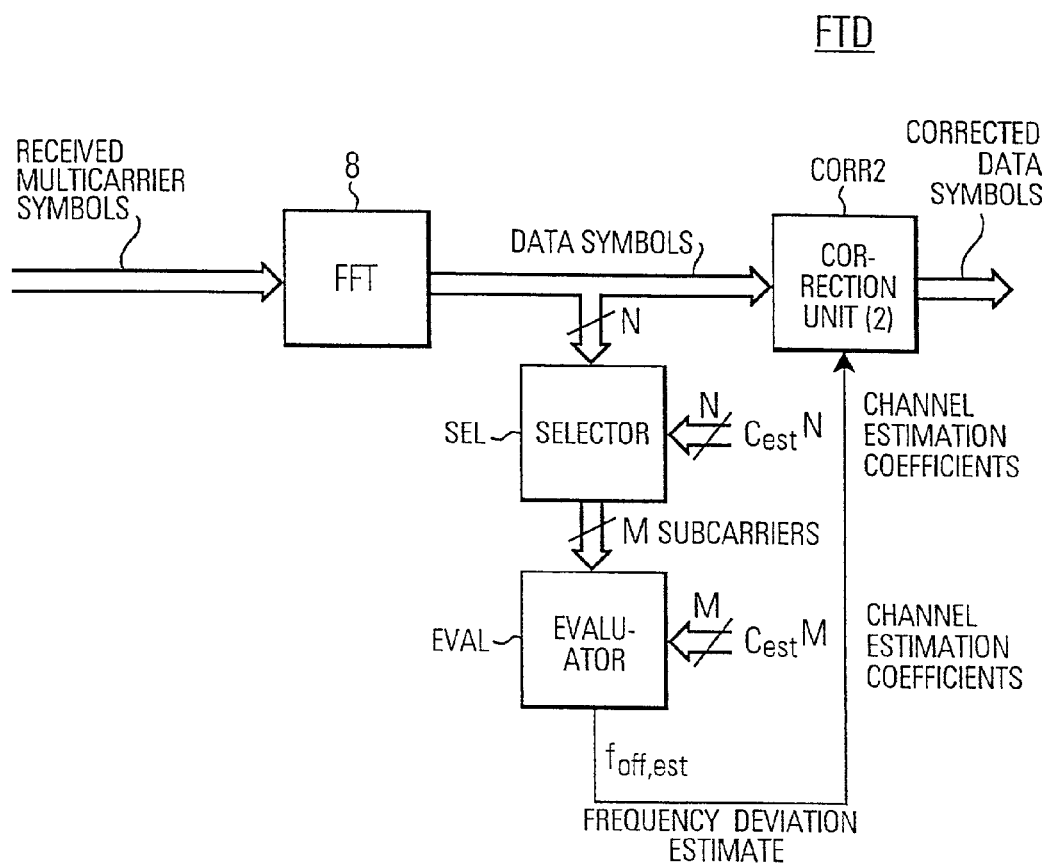
FIG. 7 shows an embodiment of the frequency tracking device FTD in accordance with the second aspect of the invention but also using a selector in accordance with the first aspect of the invention.

As shown in FIG. 7, the first aspect of the invention and the second aspect of the invention can be used in combination. In this case step S2', S3' in FIG. 6-2 will be carried out. That is, the frequency tracking device FDT shown in FIG. 7 comprises the selector SEL and the evaluator EVAL as already explained with reference to FIG. 4-1. Furthermore, the correction unit CORR2 is provided at the downstream position of the FFT filter bank 8 and the selector SEL as well as the forward correction unit CORR2 operate on the same data symbols.

Figure 8:
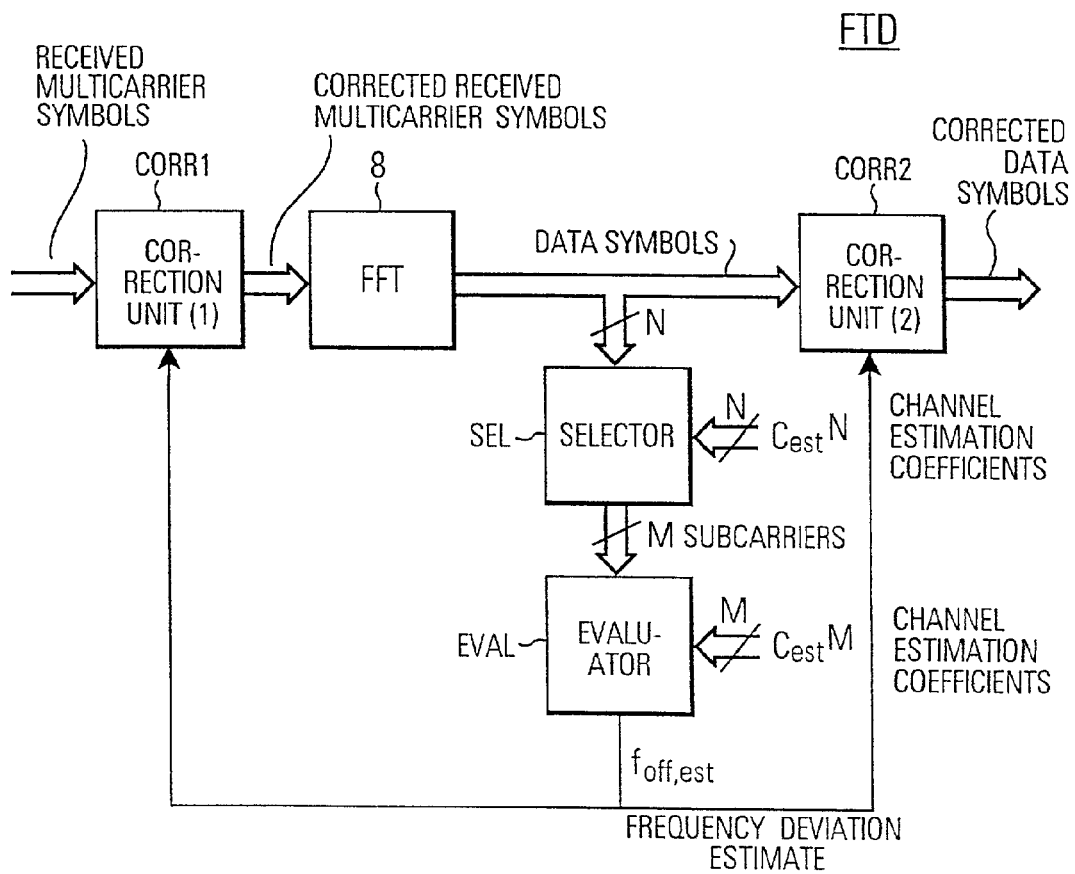
FIG. 8 shows an embodiment of the frequency tracking device FTD in which the first and second aspect of the invention are combined and a correction unit is also placed upstream of the receiver multi-carrier filter bank.

Furthermore, as shown in FIG. 8, the frequency tracking device FTD in accordance with a further aspect of the invention can comprise the feedback correction unit CORR1, the feed forward correction unit CORR2 as well as the selector SEL and the evaluator EVAL. Therefore, based on the channel coefficients an optimum selection and correction process can be carried out. Of course, in any of the frequency tracking devices FTD shown in FIGS. 5, 7, 8 (comprising a selector SEL) an adaptive adjustment of the number of subcarriers can be carried out. Furthermore, the pilot data symbol directed evaluation and/or a decision directed evaluation in accordance with the equations (6), (7) and equations (8), (9), respectively can be carried out.

INDUSTRIAL APPLICABILITY

As explained above the frequency tracking device and method in accordance with the invention can be used in any multi-carrier communication system and in particular in OFDM communication systems such as HIPERLAN/2. Since the frequency tracking device in accordance with the invention improves the accuracy of the frequency deviation estimate and it does so with decreased computational complexity data symbols can be decoded in the receiver RC with higher accuracy. These advantages will be achieved in any multi-carrier system and the frequency tracking device in accordance with the invention should not be seen limited to the OFDM system described in FIG. 1-2.

Furthermore, it should be noted that the invention is not restricted to the above described aspects and embodiments and that further improvements, modifications and variations of the invention may be carried out on the basis of the above teachings. In particular, the invention may comprise features which have been separately described in the description and the claims.

Furthermore, reference numerals in the claims only serve clarification purposes and do not limit the scope of these claims in any way.

The invention claimed is:

1. A frequency tracking device for a receiver of a multi-carrier communication system, for evaluating and correcting frequency deviations ($f_{\textit{off}}$) which are introduced into multi-carrier symbols when being transmitted between a transmitter multi-carrier filter bank and receiver multi-carrier filter bank, comprising:

a) a selector adapted to receive a set of N complex data symbols output by the receiver multi-carrier filter bank and N channel coefficients ($C_{est}$) corresponding to each sub-carrier as estimated by a channel estimator of said receiver (RC), where N is the number of used sub-carriers in the multi-carrier system, and adapted to select, on the basis of the N channel coefficients ($C_{est}$), a number M of sub-carriers corresponding to the M channel coefficients ($C_{est}$) having the largest absolute values, where M≦N;

b) an evaluator adapted to determine, on the basis of the M selected sub-carriers and their corresponding M channel coefficients ($C_{est}$), an estimate ($f_{\textit{off,est}}$) of the frequency deviation ($f_{\textit{off}}$) introduced into the multi-carrier symbols; and c) a corrector for correcting the frequency deviation introduced into the multi-carrier symbols on the basis of the determined frequency deviation estimate ($f_{\textit{off,est}}$).

2. A frequency tracking device according to claim 1, wherein
   said selector adaptively adjusts the number M at adjustment time intervals including at least one multi-carrier symbol duration.

3. A frequency tracking device according to claim 1, wherein
   said corrector includes a first correction unit (CORR1) arranged upstream the receiver multi-carrier filter bank and adapted to rotate each received multi-carrier symbol with a different phase shift depending on the frequency deviation estimate ($f_{\textit{off,est}}$) and the sample index (k) within the multi-carrier symbol.

4. A frequency tracking device according to claim 1, wherein
   said corrector includes a second correction unit arranged downstream of the receiver multi-carrier filter bank and adapted to rotate all data symbols output by the receiver multi-carrier filter bank with the same phase shift depending on the frequency deviation estimate ($f_{\textit{off,est}}$).

5. A frequency tracking device according to claim 4, wherein
   said second correction unit performs a correction of the same set of N data symbols which are subjected to the selection by said selector.

6. A frequency tracking device according to claim 1, wherein
   said corrector includes:
   a first correction unit (CORR1) arranged upstream the receiver multi-carrier filter bank and adapted to rotate each received multi-carrier symbol with a different phase shift depending on the frequency deviation estimate ($f_{\mathit{off,est}}$) and the sample index (k) within the multi-carrier symbol; and a second correction unit arranged downstream of the receiver multi-carrier filter bank and adapted to rotate all data symbols output by the multi-carrier filter bank with the same phase shift depending on the frequency deviation estimate ($f_{\mathit{off,est}}$).

7. A frequency tracking device according to claim 1, wherein
said evaluator is adapted to carry out a decision directed evaluation for said M sub-carriers.

8. A frequency tracking device according to claim 1, wherein
said evaluator is adapted to carry out a pilot carrier aided evaluation for said M sub-carriers.

9. A frequency tracking device according to claim 1, wherein
said evaluator is adapted to carry out a combination of a decision directed evaluation and a pilot carrier aided evaluation for said M subcarriers.

10. A frequency tracking device according to claim 1, wherein
the number of selected sub-carriers is M=N/4 to M=N/3 where N is the number of used subcarriers.

11. A frequency tracking device for a receiver of a multi-carrier communication system, for evaluating and correcting frequency deviations ($f_{\mathit{off}}$) which are introduced into multi-carrier symbols when being transmitted between a transmitter multi-carrier filter bank and receiver multi-carrier filter bank comprising:

a) an evaluator adapted to receive a set of N complex data symbols output by the receiver multi-carrier filter bank and N channel coefficients ($C_{\mathit{est}}$) corresponding to each sub-carrier as estimated by a channel estimator of said receiver (RC), where N is the number of used sub-carriers in the multi-carrier system (MCSYS), and to determine, on the basis of N sub-carriers and their corresponding N channel coefficients ($C_{\mathit{est}}$), an estimate ($f_{\mathit{off,est}}$) of the frequency deviation ($f_{\mathit{off}}$) introduced into the multi-carrier symbols, where N is the number of sub-carriers used in the transmitter;

b) a corrector for correcting the frequency deviation introduced into the multi-carrier symbols on the basis of the determined frequency deviation estimate ($f_{\mathit{off,est}}$); and c) wherein said corrector comprises a corrector unit arranged downstream of the receiver multi-carrier filter bank and adapted to rotate all data symbols output by the receiver multi-carrier filter bank with the same phase shift depending on the frequency deviation estimate ($f_{\mathit{off,est}}$).

12. A frequency tracking device according to claim 11, wherein
said corrector further includes a correction unit (CORR1) arranged upstream the receiver multi-carrier filter bank and adapted to rotate each received multi-carrier symbol with a different phase shift depending on the frequency deviation estimate ($f_{\mathit{off,est}}$) and the sample index (k) within the multi-carrier symbol.

13. A frequency tracking device according to claim 11, further comprising
a selector adapted to receive a set of N complex data symbols output by the receiver multi-carrier filter bank and N channel coefficients ($C_{\mathit{est}}$) corresponding to each sub-carrier as estimated by a channel estimator of said receiver (RC), where N is the number of used sub-carriers in the multi-carrier system (MCSYS), and adapted to select, on the basis of the N channel coefficients ($C_{\mathit{est}}$), a number M of sub-carriers corresponding to the M channel coefficients ($C_{\mathit{est}}$) having the largest absolute values, where M≦N; and wherein
said evaluator is adapted to determine, on the basis of the M selected sub-carriers and their corresponding M channel coefficients ($C_{\mathit{est}}$), an estimate ($f_{\mathit{off,set}}$) of the frequency deviation ($f_{\mathit{off}}$) introduced into the multi-carrier symbols.

14. Receiver of a multi-carrier communication system comprising reception means (RM) for receiving multi-carrier symbols transmitted from a transmitter (TR) via a transmission channel, a receiver multi-carrier filter bank for converting said multi-carrier symbols into complex data symbols, a data symbol sink for receiving said data symbols and a frequency tracking device in accordance with claim 1.

15. A multi-carrier communication system, comprising at least one transmitter (TR) including a data symbol source generating complex data symbols, a transmitter multi-carrier filter bank for generating multi-carrier symbols from said complex data symbols and a transmission means for transmitting said multi-carrier symbols onto a transmission channel, and at least one receiver in accordance with claim 14.

16. A method for evaluating and correcting frequency deviations ($f_{\mathit{off}}$) which are introduced into multi-carrier symbols when being transmitted between a transmitter multi-carrier filter bank and receiver multi-carrier filter bank, comprising the steps of:

a) determining, in a receiver of a multi-carrier communication system, a set of N complex data symbols output by the receiver multi-carrier filter bank and N channel coefficients ($C_{\mathit{est}}$) corresponding to each sub-carrier as estimated by a channel estimator of said receiver, where N is the number of used sub-carriers in the multi-carrier system; and b) selecting, on the basis of the N channel coefficients ($C_{\mathit{est}}$), a number M of sub-carriers corresponding to the M channel coefficients ($C_{\mathit{est}}$) having the largest absolute values, where M≦N;

c) determining, on the basis of the M selected sub-carriers and their corresponding M channel coefficients ($C_{\mathit{est}}$), an estimate ($f_{\mathit{off,est}}$) of the frequency deviation ($f_{\mathit{off}}$) introduced into the multi-carrier symbols; and d) correcting the frequency deviation introduced into the multi-carrier symbols on the basis of the determined frequency deviation estimate ($f_{\mathit{off,est}}$).

17. A method according to claim 16, wherein
said correction step includes a first correction carried out upstream a receiver multi-carrier filter bank in which each received multi-carrier symbol is rotated with a different phase shift depending on the frequency deviation estimate ($f_{\mathit{off,est}}$) and the sample index (k) within the multi-carrier symbol.

18. A method according to claim 16, wherein
said correction step includes a second correction carried out downstream a receiver multi-carrier filter bank in which all data symbols output by the receiver multi-carrier filter bank are corrected with the same phase shift depending on the frequency deviation estimate ($f_{\mathit{off,est}}$).

19. A method according to claim 16, wherein
said correction step includes:

a first correction carried out upstream a receiver multi-carrier filter bank in which each received multi-carrier symbol is rotated with a different phase shift depending on the frequency deviation estimate ($f_{off,est}$) and the sample index (k) within the multi-carrier symbol; and a second correction carried out downstream a receiver multi-carrier filter bank in which all data symbols output by the receiver multi-carrier filter bank are corrected with the same phase shift depending on the frequency deviation estimate ($f_{off,est}$).

20. A method for evaluating and correcting frequency deviations ($f_{off}$) which are introduced into multi-carrier symbols when being transmitted between a transmitter multi-carrier filter bank and receiver multi-carrier filter bank, comprising the steps of:

a) determining, in a receiver of a multi-carrier communication system, a set of N complex data symbols output by the receiver multi-carrier filter bank and N channel coefficients ($C_{est}$) corresponding to each sub-carrier as estimated by a channel estimator of said receiver, where N is the number of used sub-carriers in the multi-carrier system, and b) determining, on the basis of N sub-carriers and their corresponding N channel coefficients ($C_{est}$), an estimate ($f_{off,est}$) of the frequency deviation ($f_{off}$) introduced into the multi-carrier symbols, where N is the number of sub-carriers used in the transmitter; and c) correcting the frequency deviation ($f_{off}$) introduced into the multi-carrier symbols on the basis of the determined frequency deviation estimate ($f_{off,est}$); and d) wherein said correction step comprises a correction carried out downstream of the receiver multi-carrier filter bank in which all data symbols output by the receiver multi-carrier filter bank are rotated with the same phase shift depending on the frequency deviation estimate ($f_{off,est}$).

21. A method according to claim 20, wherein said correction step further includes a correction step carried out upstream the receiver multi-carrier filter bank in which each received multi-carrier symbol is rotated with a different phase shift depending on the frequency deviation estimate ($f_{off,est}$) and the sample index (k) within the multi-carrier symbol.

22. A method according to claim 20, further including the steps of, selecting, on the basis of the N channel coefficients ($C_{est}$), a number M of sub-carriers corresponding to the M channel coefficients ($C_{est}$) having the largest absolute values, where M≤N; and wherein determining, on the basis of the M selected sub-carriers and their corresponding M channel coefficients ($C_{est}$), an estimate ($f_{off,set}$) of the frequency deviation ($f_{off}$) introduced into the multi-carrier symbols.

23. A receiver of a multi-carrier communication system, comprising reception means for receiving multi-carrier symbols transmitted from a transmitter via a transmission channel, a receiver multi-carrier filter bank for converting said multi-carrier symbols into complex data symbols, a data symbol sink for receiving said data symbols and a frequency tracking device in accordance wit claim 11.

24. A multi-carrier communication system, comprising at least one transmitter (TR) including a data symbol source generating complex data symbols, a transmitter multi-carrier filter bank for generating multi-carrier symbols from said complex data symbols and a transmission means for transmitting said multi-carrier symbols onto a transmission channel, and at least one receiver in accordance with claim 23.

25. A frequency tracking device according to claim 1, wherein the number of selected sub-carriers M is determined using the N channel coefficients estimated by the channel estimator, a noise bandwidth for a loop gain in a phase locked of the corrector; a noise variance of additive noise; and, a variance of phase error.

26. The frequency tracking device according to claim 1, wherein the number of selected sub-carriers M is determined using $$\sigma_{\phi err}^2 = \frac{\sigma_{n'}^2}{2} B_n(a) \frac{1}{M^2} \sum_{m=0}^{M-1} \frac{1}{|C_m(i)|^2 |d_m(i)|^2}$$

wherein $C_m(i)$ are the channel coefficients estimated by the channel estimator;

$d_m(i)$ is transmitted data, mapped on to subcarrier m;

$B_n(a)$ is a noise variance bandwidth for a loop gain in a PLL tracking scheme of the corrector;

$\sigma_{n'}^2$ is a noise variance of additive noise; and, $\sigma_{100\ err}^2$ is a variance of the phase error.

27. The frequency tracking device according to claim 1, wherein the number of selected sub-carriers M is determined using $$\sigma_{\phi err}^2 = \frac{\sigma_{n'}^2}{2} B_n(a) \frac{1}{\sum_{m=1}^{M} |d_m(i)|^2 |C_m(i)|^2}$$

wherein $C_m(i)$ are the channel coefficients estimated by the channel estimator;

$d_m(i)$ is transmitted data, mapped on to subcarrier m;

$B_n(a)$ is a noise bandwidth for a loop gain a in a PLL tracking scheme of the corrector;

$\sigma_{n'}^2$ a is a noise variance of additive noise; and, $\sigma_{\phi err}^2$ is a variance of the phase error.

* * * * *